United States Patent
Kazmierczak

(10) Patent No.: US 6,650,216 B2
(45) Date of Patent: Nov. 18, 2003

(54) INDUCTIVE TRANSFORMER AND METHOD FOR PRODUCING THE SAME

(75) Inventor: Harald Kazmierczak, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/088,312
(22) PCT Filed: Aug. 28, 2001
(86) PCT No.: PCT/DE01/03271
§ 371 (c)(1),
(2), (4) Date: Jun. 4, 2002
(87) PCT Pub. No.: WO02/24484
PCT Pub. Date: Mar. 28, 2002

(65) Prior Publication Data
US 2002/0171522 A1 Nov. 21, 2002

(30) Foreign Application Priority Data
Sep. 20, 2000 (DE) .......................................... 100 46 658

(51) Int. Cl.$^7$ .............................................. H01F 21/04
(52) U.S. Cl. ........................ 336/117; 336/115; 336/130
(58) Field of Search .................................. 336/115, 117, 336/136, 145, 182; 29/602.1

(56) References Cited

FOREIGN PATENT DOCUMENTS

| EP | 0 183 580 A | * | 6/1986 |
| EP | 1 000 812 A | | 5/2000 |

* cited by examiner

Primary Examiner—Elvin Enad
Assistant Examiner—Jennifer A. Poker
(74) Attorney, Agent, or Firm—Michael J. Striker

(57) ABSTRACT

An inductive transformer for transmitting measurement data and/or electrical energy between two components (1, 2) moving relative to one another includes one primary and one secondary transformer part (4, 5), in which a gap is formed between the moving components (1, 2). A slide ring (6; 7), which is made of a plastic with embedded ferromagnetic metal parts is disposed in the gap. The metal parts are distributed nonhomogeneously in the plastic, such that their proportion, on the end with which it is solidly disposed on one of the components (1, 2), is high and becomes relatively slight toward the end with which it rubs against the respective other component (1, 2).

5 Claims, 1 Drawing Sheet

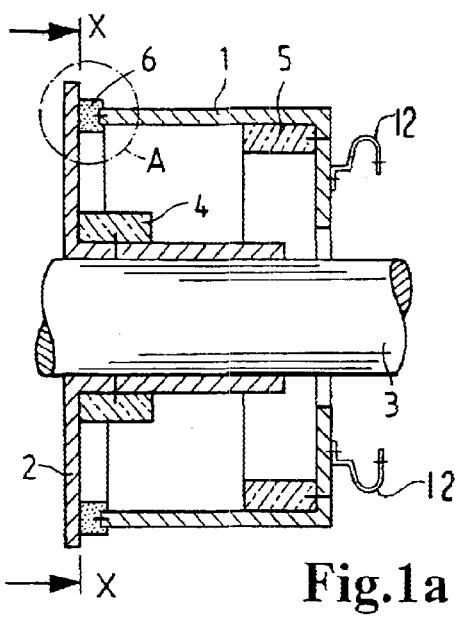
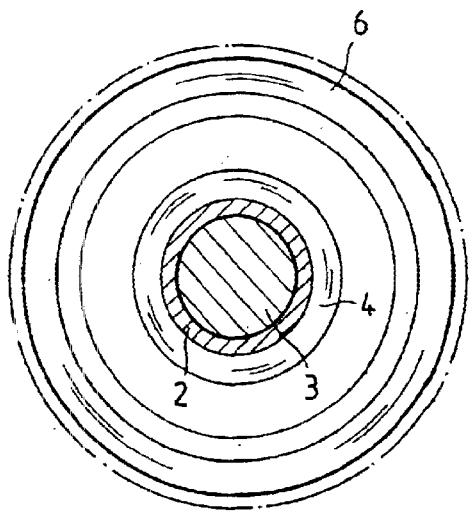
Fig.1a Fig.1b
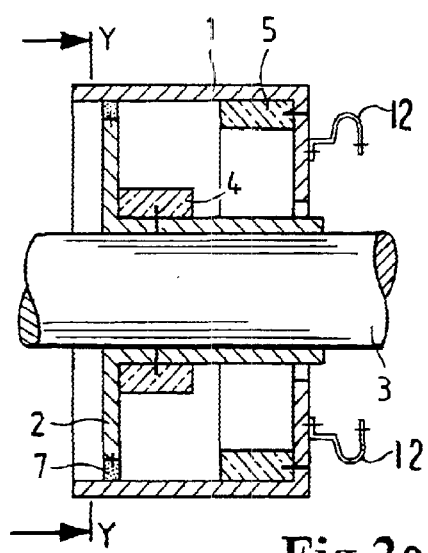
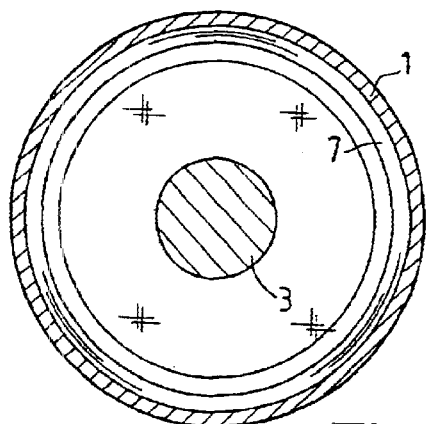
Fig.2a Fig.2b
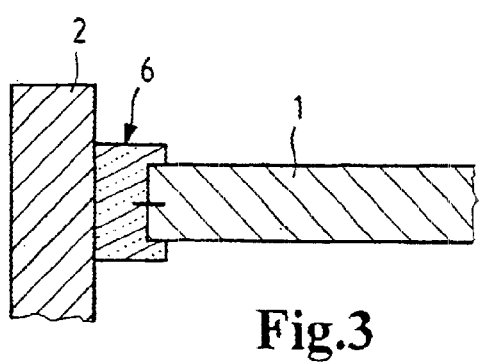
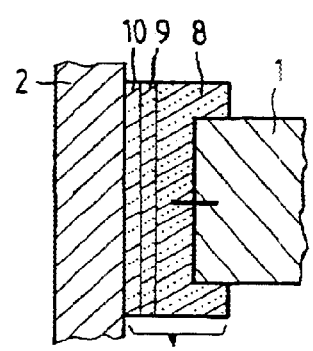
Fig.3 Fig.4

INDUCTIVE TRANSFORMER AND METHOD FOR PRODUCING THE SAME

BACKGROUND OF THE INVENTION

The invention relates to an inductive transformer, in particular, a rotary transformer, for transmitting signals and/or energy between moving components and to a production method.

In the transmission of electrical signals and energy, for example to moving parts in a motor vehicle in conjunction with sensors mounted on the moving parts, it often becomes necessary, despite mechanical guidance problems, to establish a secure and yet flexible electrical or magnetic coupling between the moving parts. For instance in steering angle sensors for detecting the rotational angle of a steering wheel, major assembly and positional tolerances in the millimeter range, such as a play of approximately ±5 mm, exist between the rotatable steering spindle and the fixed steering column.

In the inductive transmission, known per se, of electrical energy and data from the steering column to the steering wheel in the motor vehicle, this play must also be preserved between the primary and secondary parts of the rotary transformer. As a rule, the result is relatively poor efficiency of the transmission.

Since the energy transmission in the cases described above can be on the level of approximately 1 watt if only the steering wheel electronics have to be supplied, and an additional 120 watts if a steering wheel heater is to be supplied, in such cases a winding spring is conventionally provided for data transmission and a wiper ring is conventionally provided for energy transmission. The winding spring and the wiper ring, however, in principle have a relatively high noise level and at the same time cause so-called EMC problems (EMC=electromagnetic compatibility).

SUMMARY OF THE INVENTION

According to the invention, an inductive transformer for transmitting measurement data and/or electrical energy between two components moving relative to one another, with one primary and one secondary transformer part is advantageously refined. In a gap that is necessarily created between the moving components, according to the invention a slide ring is provided, which comprises a plastic with embedded ferromagnetic metal parts.

The metal parts in the plastic are advantageously distributed in such a way that their proportion, on the end with which it is solidly disposed on one of the components, is high and becomes relatively slight toward the end with which it rubs against the respectively other component. Preferably, the metal parts are iron parts in the form of dust, chips or beads of tiny diameter, and the plastic is silicone or an elastomer with similar properties. This nonhomogeneity assures that in the sliding region, the abrasion is low because of the tiny proportion of iron parts, but the overall flux conductivity is improved.

An advantageous use is obtained in particular if one transformer part is mounted on the steering spindle of a vehicle, and another transformer part is mounted on the steering column of a vehicle, and then a transmission of measurement data and/or energy can be performed in a simple way, via the transformer parts.

It is also advantageously possible, in a method for producing an inductive transformer of the type defined above, to produce the slide ring by the following method steps. First, the homogeneous, flowable plastic filled with iron parts is placed in a mold for the contour of the slide ring. Then, by the intrinsic weight of the iron parts, sedimentation occurs, such that the iron parts are deposited in the region in which a high proportion is desired, and then the now-nonhomogeneous plastic hardens.

These and other characteristics of preferred refinements of the invention are disclosed not only in the claims but also in the description and the drawings; the individual characteristics can each be realized alone or in the form of subcombinations in the embodiment of the invention and in other fields and can represent both advantageous and patentable embodiments for which patent protection is here claimed.

BRIEF DESCRIPTION OF THE DRAWINGS

Exemplary embodiments of an inductive transformer of the invention for transmitting signals and energy between components of a rotary transformer will be described in conjunction with the drawing. Shown are:

FIGS. 1a and 1b, an elevation view and a section X—X through a rotary transformer between a steering spindle and a steering column of a motor vehicle, with a slide ring on the component connected to the steering column;

FIGS. 2a and 2b, an elevation view and a section Y—Y through a rotary transformer between a steering spindle and a steering column of a motor vehicle, with a slide ring on the component connected to the steering column;

FIG. 3, a detail showing the gap between the components with the slide ring of FIG. 1a; and FIG. 4, a section through the layers of the slide ring.

DETAILED DESCRIPTION OF THE PREFERRED EMBODIMENTS

In FIGS. 1a and 1b, a component 1 is shown that is connected to the steering column of a motor vehicle, not shown here. A second component 2 is mounted on the end of a steering spindle 3 and is rotatable by means of a steering wheel and is held via a suitable bearing means on the steering column, which is solidly connected to the body of the vehicle.

An inductive rotary transformer with transformer parts or coils 4 and 5 is disposed between the components 1 and 2 and thus between the steering column and the steering spindle 3; with it, measurement data and/or electrical energy can be transmitted between sensors, disposed for instance on the steering spindle 3, and a central evaluation unit in the vehicle. The primary transformer part 4 is formed by a coil and an associated core, and the secondary transformer part 5 is formed by a coil and an associated core.

In the construction of such inductive transformers on a steering apparatus, as a rule gaps develop because of the bearing play resulting from production and assembly. This is particularly problematic in the region of the magnetic flux between the two transformer parts 4 and 5, creating a not-insignificant possibility that electromagnetic rays will be emitted that can cause interference in the motor vehicle.

In the exemplary embodiment of FIG. 1a, a slide ring 6 is therefore disposed on the component 1, the latter being solidly connected to the steering column. The slide ring 6 is produced from a plastic with nonhomogeneously embedded ferromagnetic metal parts, in particular iron parts, and is described further below in conjunction with FIGS. 3 and 4.

In FIG. 2a, a second exemplary embodiment is shown, which differs from the first in that in this case a slide ring 7 is solidly attached to the component 2, which in turn is retained on the steering spindle 3. All the other elements, which in principle are identical, are provided with the same reference numerals as in FIG. 1.

FIG. 3 shows a detail of the region A of the disposition of the slide ring 6 of FIG. 1a and correspondingly of FIG. 2 as well. The iron parts in the plastic comprising the slide ring 6 are distributed so nonhomogeneously, as shown in FIG. 4, that their proportion is high on the end 8 with which the slide ring is solidly disposed on the component 1 of FIG. 1, and becomes relatively slight over a region 9 toward the region 10 with which it rubs against the other component 2.

What is claimed is:

1. An inductive transformer for transmitting measurement data and/or electrical energy between two components (1, 2) moving relative to one another, with one primary and one secondary transformer part (4, 5), in which a gap is formed between the moving components (1, 2), characterized in that a slide ring (6; 7), which comprises a plastic with embedded ferromagnetic metal parts is disposed in the gap, wherein the slide ring fills the gap between the components (1, 2); and that the metal parts are distributed nonhomogeneously in the plastic, such that a proportion of the metal parts, on an end with which the slide ring is solidly disposed on one of the components (1, 2), is high and becomes relatively slight toward an end with which the slide ring rubs against a respective other component (1, 2).

2. The inductive transformer of claim 1, characterized in that the metal parts are iron parts formed as dust or a spherical disposition of ferromagnetic substances.

3. The inductive transformer of claim 1, characterized in that the plastic is silicone, or an elastomer with similar properties as silicone.

4. The inductive transformer of claim 1, characterized in that one transformer part (4) is mounted on steering spindle (2) of a vehicle, and another transformer part (5) is mounted on a steering column of a vehicle, and that via the transformer parts (4, 5), a transmission of measurement data and/or energy can be performed.

5. The inductive transformer of claim 2, characterized in that the nonhomogeneous slide ring (6; 7) is produced by the following method steps:

a homogeneous, flowable plastic filled with iron parts is placed in a mold for a contour of the slide ring (6; 7);

by an intrinsic weight of the iron parts, sedimentation is attained such that the iron parts are deposited in a region where a high proportion is desired; and the plastic is hardened.

* * * * *